US006483267B1

(12) United States Patent
Jurney

(10) Patent No.: US 6,483,267 B1
(45) Date of Patent: Nov. 19, 2002

(54) AUXILIARY VEHICULAR WINDOW RECESSING SYSTEM

(76) Inventor: John K. Jurney, 1305 Western Chapel Rd., New Windsor, MD (US) 21776

(*) Notice: Subject to any disclaimer, the term of this patent is extended or adjusted under 35 U.S.C. 154(b) by 0 days.

(21) Appl. No.: 09/965,732

(22) Filed: Sep. 27, 2001

(51) Int. Cl.[7] .............................. H02P 1/00; H02P 3/00

(52) U.S. Cl. ......................... 318/283; 318/62; 318/264; 318/267; 318/282

(58) Field of Search ............................. 318/54, 62, 65, 318/440, 445–447, 256, 264–267, 280–283, 286, 564

(56) References Cited

U.S. PATENT DOCUMENTS

| | | | | |
|---|---|---|---|---|
| 5,327,990 A | | 7/1994 | Busquets | |
| 5,547,208 A | | 8/1996 | Chappell et al. | |
| 5,574,315 A | | 11/1996 | Weber | |
| 5,790,419 A | | 8/1998 | Matsuda et al. | |
| 6,072,290 A | | 6/2000 | Takagi et al. | |
| 6,081,085 A | | 6/2000 | Ohashi et al. | |
| 6,278,250 B1 | * | 8/2001 | Sasaki | 318/283 |
| 6,281,647 B1 | * | 8/2001 | Sasaki | 318/265 |
| 6,288,506 B1 | * | 9/2001 | Hiwatari | 318/283 |

* cited by examiner

*Primary Examiner*—Marlon T. Fletcher

(57) ABSTRACT

A auxiliary vehicular window recessing system for providing a secondary means of recessing the electrically-controlled windows of a vehicle in the event of submergence in a body of water. The auxiliary vehicular window recessing system includes a secondary motor for moving the window of the vehicle. A secondary gear member driven by the secondary motor is engaged with the main drive gear such that rotary motion of the secondary gear member biases the primary window drive system thereby recessing the window when the secondary motor is activated. An auxiliary, waterproof battery provides power, while a sealed fuse electrically protects the secondary motor. Optionally or in conjunction, a manual crank apparatus engages the primary window drive system for manually recessing the window.

16 Claims, 3 Drawing Sheets

AUXILIARY VEHICULAR WINDOW RECESSING SYSTEM

BACKGROUND OF THE INVENTION

1. Field of the Invention

The present invention relates to vehicular window egress systems and more particularly pertains to a new auxiliary vehicular window recessing system for providing a secondary means of recessing the electrically-controlled windows of a vehicle in the event of submergence in a body of water.

2. Description of the Prior Art

The use of vehicular window egress systems is known in the prior art. U.S. Pat. No. 6,072,290 describes a waterproof power window device that is completely electronic in nature. Another type of vehicular window egress systems is U.S. Pat. No. 5,574,315 having a sensor for detecting a collision of some kind which in turn automatically unlocks the electric door locks, and lowers the electric windows.

While these devices fulfill their respective, particular objectives and requirements, the need remains for a system that is especially designed to be separate from the vehicle's primary systems and also includes a manual apparatus for manually lowering the windows by the occupant.

SUMMARY OF THE INVENTION

The present invention meets the needs presented above by integrating a completely separate drive motor and power source, along with an optional mechanically integrated handle for opening the window.

Still yet another object of the present invention is to provide a new auxiliary vehicular window recessing system that includes both a waterproof drive motor, fuse, and battery.

Even still another object of the present invention is to provide a new auxiliary vehicular window recessing system that could provide dual backup protection by utilizing both the electric and mechanical devices together.

To this, the present invention generally comprises a secondary motor for moving the window of the vehicle. A secondary gear member driven by the secondary motor is engaged with the main drive gear such that rotary motion of the secondary gear member biases the primary window drive system thereby recessing the window when the secondary motor is activated. An auxiliary, waterproof battery provides power, while a sealed fuse electrically protects the secondary motor. Optionally or in conjunction, a manual crank apparatus engages the primary window drive system for manually recessing the window.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
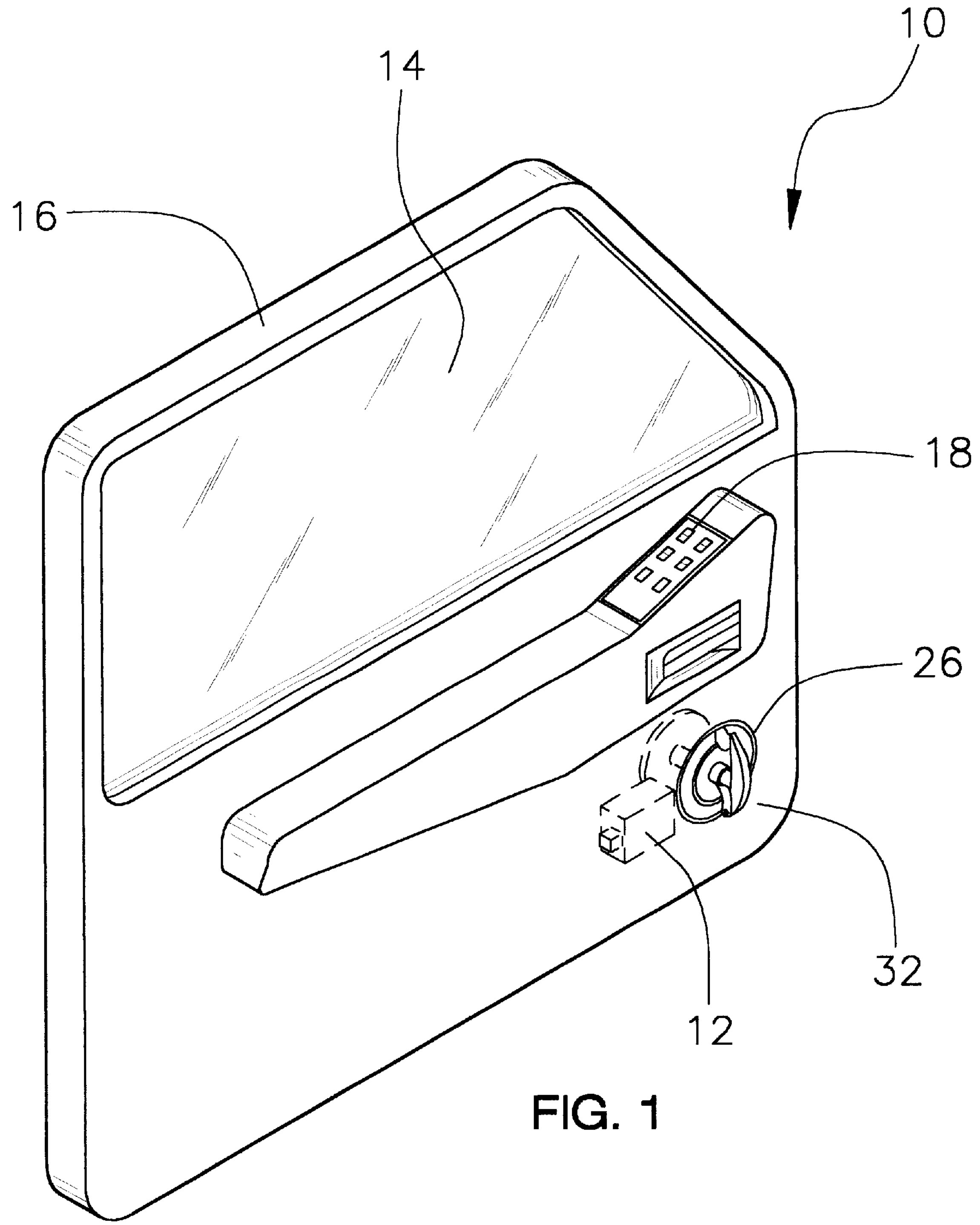
FIG. 1 is a schematic perspective view of a new auxiliary vehicular window recessing system according to the present invention.
Figure 2:
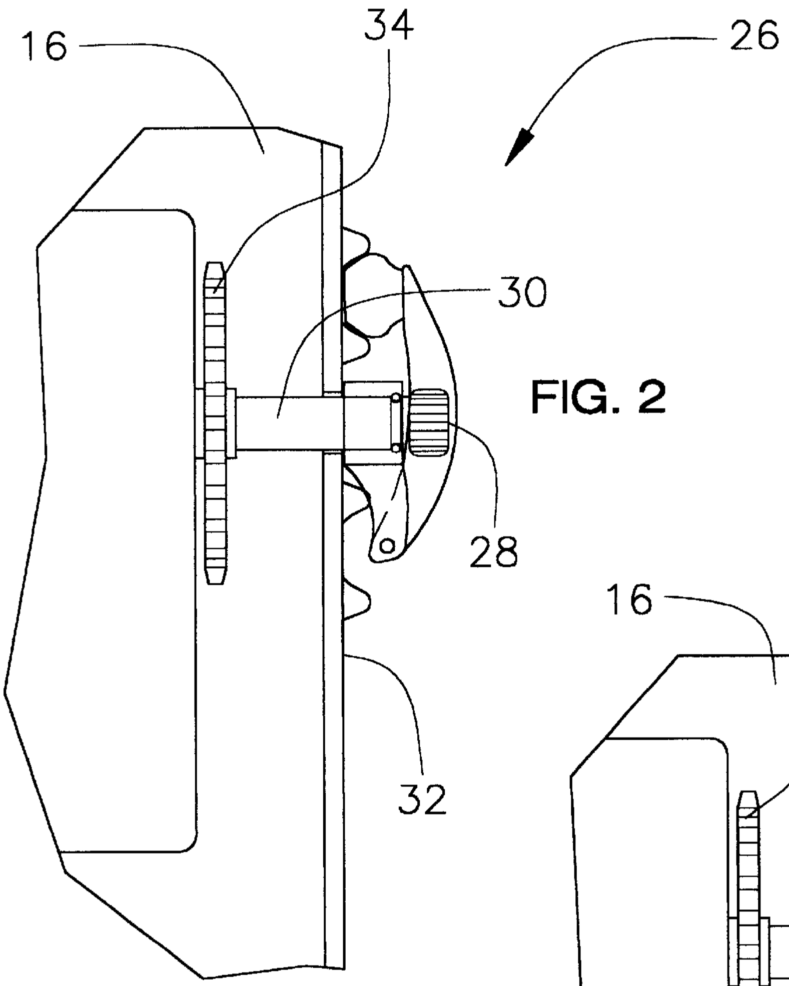
FIG. 2 is a schematic side view of the manual crank apparatus with the crank member in the stored position.
Figure 3:
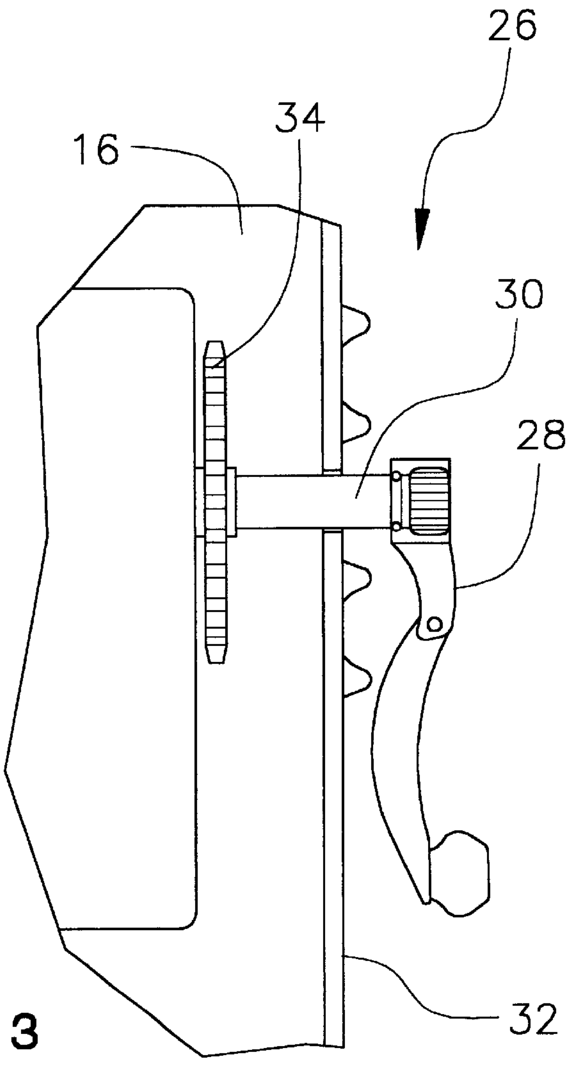
FIG. 3 is a schematic side view of the manual crank apparatus with the crank member in the ready position.
Figure 4:
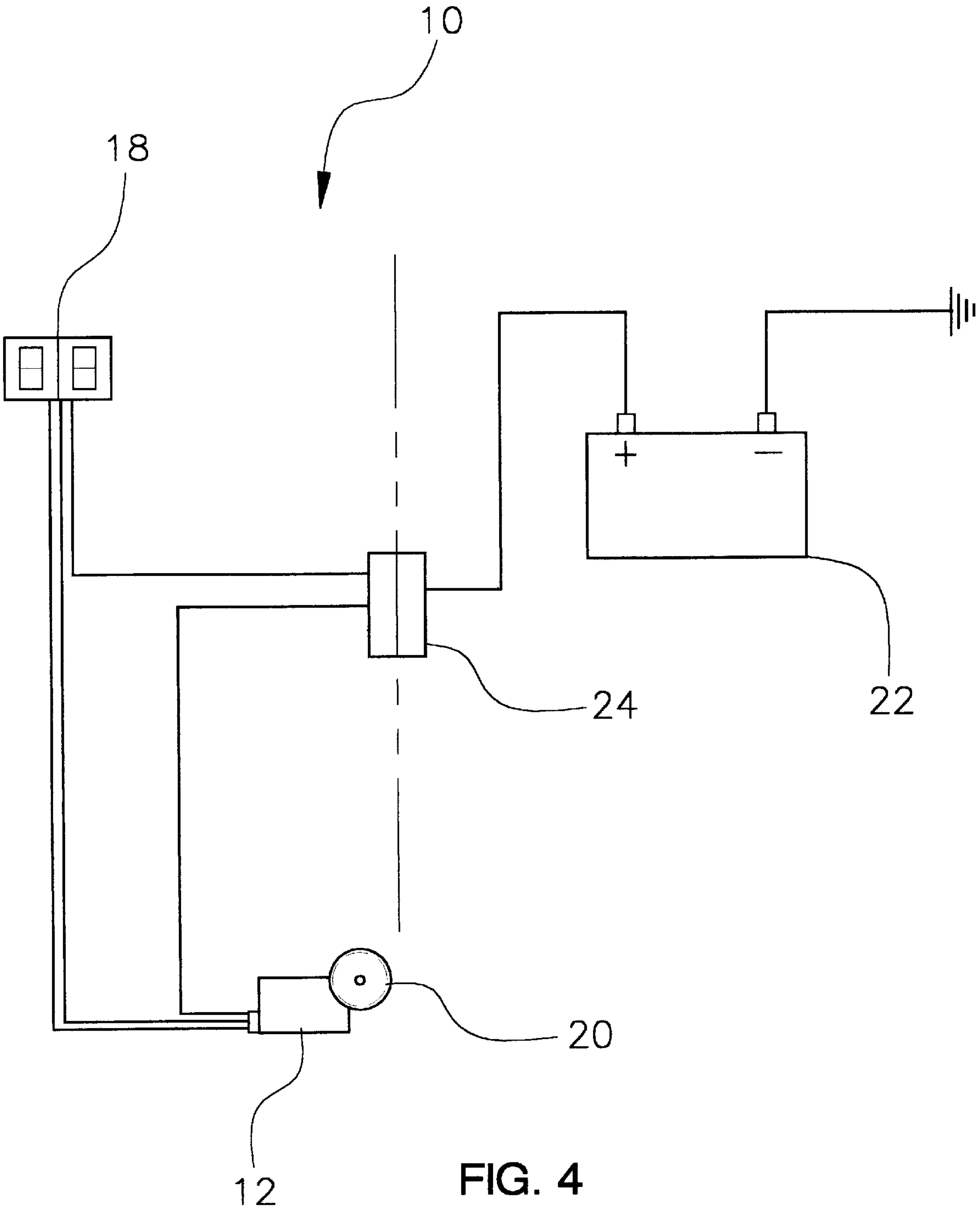
FIG. 4 is an electrical schematic of the present invention.

With reference now to the drawings, and in particular to FIGS. 1 through 4 thereof, a new auxiliary vehicular window recessing system embodying the principles and concepts of the present invention and generally designated by the reference numeral 10 will be described.

As best illustrated in FIGS. 1 through 4, the auxiliary vehicular window recessing system 10 generally comprises a secondary motor 12 for moving the window 14 of a vehicle. The secondary motor 12 is substantially watertight. The secondary motor 12 is positioned in the vehicle door 16 adjacent a primary window drive system. The secondary motor 12 is operationally coupled to directional switches 18.

A secondary gear member 20 drives the primary window drive system when the secondary motor 12 is enabled. The secondary gear member 20 is rotatably attached to the secondary motor 12. The secondary gear member 20 is engaged with a main drive gear such that rotary motion of the secondary gear member 20 biases the primary window drive system thereby recessing the window 14.

An auxiliary battery 22 powers the secondary motor 12. The auxiliary battery 22 is positioned within the vehicle and electrically coupled to the secondary motor 12. The auxiliary battery 22 is substantially watertight.

A fuse 24 electrically protects the secondary motor 12. The fuse 24 operationally couples the secondary motor 12 to the auxiliary battery 22. The fuse 24 is positioned within the vehicle and is substantially watertight.

As a secondary embodiment, a manual crank apparatus 26 engages the primary window drive system for manually recessing the window 14. The manual crank apparatus 26 has a crank member 28 pivotally coupled to a crank shaft 30. The crank member 28 is flushly positionable against an interior surface 32 of a vehicle door 16 when not in use.

The crank shaft 30 is attached to a manual gear drive member 34. The manual gear drive member 34 is operationally coupled to the primary window drive system such that rotation of the crank member 28 facilitates vertical movement of the window 14.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An auxiliary vehicular window recessing system for repositioning a window in a vehicle door when primary power to a primary electrical window drive system is disabled, the primary window drive system including directional switches, a main drive motor, and a main drive gear, said system comprising:

a secondary motor for moving the window of the vehicle;

a secondary gear member for driving the primary window drive system when said secondary motor is enabled;

an auxiliary battery for powering said secondary motor;

a fuse for electrically protecting said secondary motor, and a manual crank apparatus engaging said primary window drive system for manually recessing the window.

2. The backup vehicular window recessing device as set forth in claim 1, wherein said secondary motor being substantially watertight.

3. The backup vehicular window recessing device as set forth in claim 1, wherein said secondary motor being positioned in the vehicle door adjacent the primary window drive system.

4. The backup vehicular window recessing device as set forth in claim 1, wherein said secondary motor being operationally coupled to the directional switches.

5. The backup vehicular window recessing device as set forth in claim 1, wherein said secondary gear member being rotatably attached to said secondary motor.

6. The backup vehicular window recessing device as set forth in claim 1, wherein said secondary gear member being engaged with the main drive gear such that rotary motion of said secondary gear member biases said primary window drive system thereby recessing the window.

7. The backup vehicular window recessing device as set forth in claim 1, wherein said auxiliary battery being positioned within the vehicle.

8. The backup vehicular window recessing device as set forth in claim 1, wherein said auxiliary battery being electrically coupled to said secondary motor.

9. The backup vehicular window recessing device as set forth in claim 1, wherein said auxiliary battery being substantially watertight.

10. The backup vehicular window recessing device as set forth in claim 1, wherein said fuse operationally coupling said secondary motor to said auxiliary battery.

11. The backup vehicular window recessing device as set forth in claim 1, wherein said fuse being positioned within the vehicle, said fuse being substantially watertight.

12. The backup vehicular window recessing device as set forth in claim 1, further comprising said manual crank apparatus having a crank member pivotally coupled to a crank shaft.

13. The backup vehicular window recessing device as set forth in claim 12, wherein said crank member being flushly positionable against an interior surface of an vehicle door when not in use.

14. The backup vehicular window recessing device as set forth in claim 12, said crank shaft being attached to a manual gear drive member.

15. The backup vehicular window recessing device as set forth in claim 14, wherein said manual gear drive member being operationally coupled to said primary window drive system such that rotation of said crank member facilitates vertical movement of the window.

16. An auxiliary vehicular window recessing system for repositioning a window in a vehicle door when primary power to a primary electrical window drive system is disabled, the primary window drive system including directional switches, a main drive motor, and a main drive gear, said system comprising:

a secondary motor for moving the window of the vehicle, said secondary motor being substantially watertight, said secondary motor being positioned in the vehicle door adjacent the primary window drive system, said secondary motor being operationally coupled to the directional switches;

a secondary gear member for driving the primary window drive system when said secondary motor is enabled, said secondary gear member being rotatably attached to said secondary motor, said secondary gear member being engaged with the main drive gear such that rotary motion of said secondary gear member biases said primary window drive system thereby recessing the window;

an auxiliary battery for powering said secondary motor, said auxiliary battery being positioned within the vehicle, said auxiliary battery being electrically coupled to said secondary motor, said auxiliary battery being substantially watertight;

a fuse for electrically protecting said secondary motor, said fuse operationally coupling said secondary motor to said auxiliary battery, said fuse being positioned within the vehicle, said fuse being substantially watertight; and a manual crank apparatus engaging said primary window drive system for manually recessing the window, said manual crank apparatus having a crank member pivotally coupled to a crank shaft, said crank member being flushly positionable against an interior surface of an vehicle door when not in use, said crank shaft being attached to a manual gear drive member, said manual gear drive member being operationally coupled to said primary window drive system such that rotation of said crank member facilitates vertical movement of the window.

* * * * *